INVENTOR
JOSEPH PICKLES

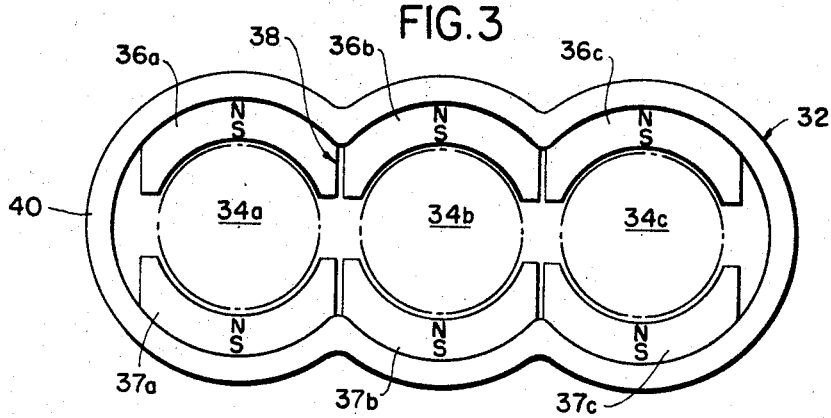
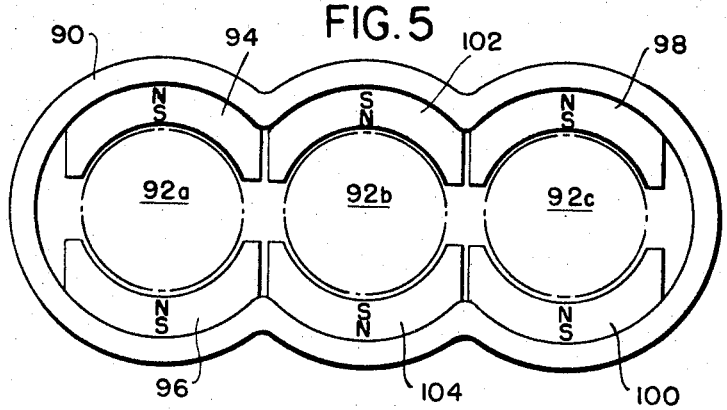
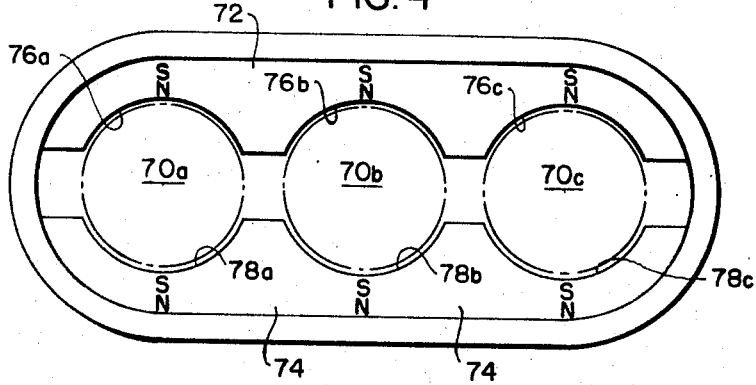

3,437,303
SEAT ADJUSTMENT MECHANISM
Joseph Pickles, Bloomfield Hills, Mich., assignor to Ferro Manufacturing Corporation, Detroit, Mich., a corporation of Michigan
Application Mar. 31, 1966, Ser. No. 539,037, which is a continuation-in-part of application Ser. No. 480,024, Aug. 16, 1965. Divided and this application July 10, 1967, Ser. No. 652,339
Int. Cl. A47j 47/16; A45d 17/04
U.S. Cl. 248—394                6 Claims

ABSTRACT OF THE DISCLOSURE

Seat adjustment mechanism providing at least two different adjustments with separate actuating devices therefor, and a motor having a separate armature connected directly to each of said devices, the armatures of said motor being disposed in side by side relationship and provided with permanent magnets establishing the motor field.

Cross-reference to related applications

This application is a division of my prior copending application Ser. No. 539,037 filed Mar. 31, 1966, now Patent 3,365,163, which application in turn is a continuation-in-part of my earlier application Ser. No. 480,024 filed Aug. 16, 1965 (now abandoned).

Background of the invention

In power seats for automobiles there has been a gradual evolution starting with a system in which completely independent electric motors were provided for effecting different adjustments. Subsequently, it was found more efficient to provide a single rugged powerful electric motor adapted to be coupled by suitable clutches and gearing to one or more of the separate adjusting mechanisms to effect a plurality of adjustments either independently or simultaneously. More recently, there has been a desire on the part of automotive designers to lower the entire silhouette of the vehicle with the result that available space for the seat adjusting mechanism has been reduced substantially below that which was available previously.

Summary of the invention

In accordance with the present invention overall efficiency as well as the space occupied by the seat adjusting mechanism is substantially reduced by the provision of a single motor means comprising a plurality of armatures arranged in a side by side or coplanar relationship, each of the armatures having a direct connection to a single seat adjusting device, thus eliminating the necessity for gearing and clutches. In addition, since each of the armatures is required to perform only a single seat adjusting function, such for example as fore and aft adjustment, or vertical adjustment of the forward or rear edge of the seat support mechanism, the armatures and the means for establishing the magnetic field may be selected to provide only the requisite power without requiring substantially excess power as was previously necessary when a single motor might be required to actuate a plurality of seat adjusting devices simultaneously. In addition, the motor comprises permanent magnets for establishing the motor field and these eliminate the usual field windings and provide the required field with a minimum of space. Permanent magnets are contacted with an external iron shell establishing the return path for magnetic flux.

It is accordingly an object of the present invention to provide seat adjusting mechanism comprising a plurality of independently operable seat adjusting devices, motor means comprising a single iron casing, a plurality of separately operable and reversible rotatable armatures within said motor means, each of said armatures being provided with a pair of permanent magnetic means for establishing the motor field.

Other objects and features of the invention will become apparent as the description proceeds, especially when taken in conjunction with the accompanying drawing, illustrating preferred embodiments of the invention.

Brief description of the drawing

FIGURE 3 is an enlarged cross-sectional view on the line 3—3, FIGURE 1, illustrating the basic construction of the motor means.

FIGURES 4 and 5 are views similar to FIGURE 3 showing somewhat different embodiments of the motor means.

Description of the preferred embodiments

Figure 1:
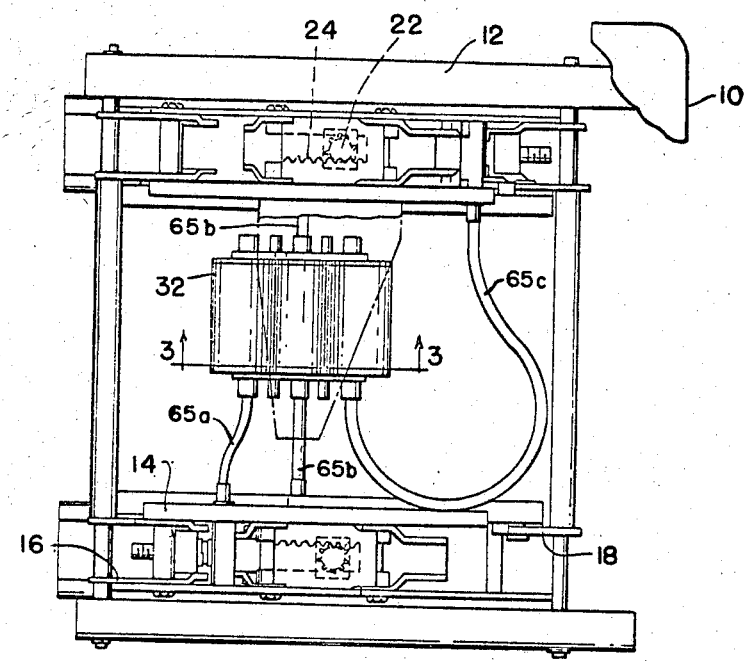
FIGURE 1 is a simplified plan view illustrating the seat supporting and adjusting mechanism and the drive means therefor, with the vehicle seat removed.
Figure 2:
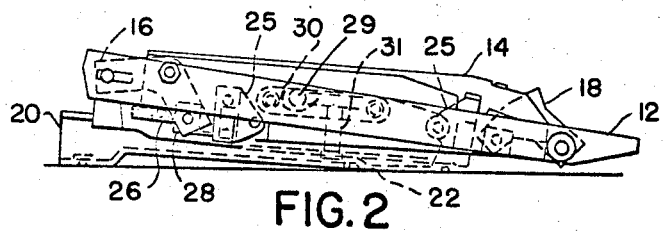
FIGURE 2 is an elevational view of the mechanism seen in FIGURE 1.

Referring first to FIGURES 1 and 2 there is illustrated a vehicle seat, a portion of which is indicated at 10, the seat being supported on seat support bars 12. The bars 12 are supported from slides 14 by levers 16 and 18. The slides 14 are longitudinally movable on tracks 20 and movement of the slides is effected by pinions 22 associated with racks 24.

With this mechanism it is possible to effect fore and aft adjustment of the seat by rotation of the pinions 22, tilting of the seat by selective actuation of the levers 16 and 18, and generally vertical movement of the seat by simultaneous actuation of the levers 16 and 18 in the same direction.

Figure 6:
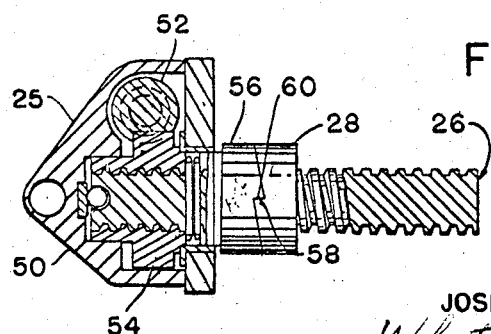
FIGURE 6 is a sectional view of an actuating means for one seat adjusting device.

It will be noted that the mechanism for effecting tilting of the levers 16 and 18 includes actuating means 25, details of which are shown in FIGURE 6. Each actuating means 25 comprises a housing 50 which contains a worm 52 in mesh with a worm gear 54 carried by a threaded shaft 26. The threaded shaft 26 carries a nut 28 as best seen in FIGURE 2, which is pivotally connected to the lever 16 or 18 so that upon rotation of the screw, the nut travels longitudinally of the screw and effects corresponding tilting of the associated lever 16 or 18. In order to prevent jamming of the nut 28 when it reaches one limiting position, an abutment element 56 is provided in fixed relation on the screw shaft 26, the element having a shoulder 58 engageable by a shoulder 60 on the nut 28. The shoulders 58 and 60 extend substantially radially of the nut 28 and abutment element 56 so that there is no tendency for the nut to jam on the threads of the screw shaft.

The mechanism for effecting rotation of the pinions 22 is similar and includes a worm 29 in mesh with a worm gear 30 which is connected by a shaft 31 to the pinion 22.

From the foregoing it will be observed that the devices for effecting fore and aft longitudinal adjustment of the seat, as well as the devices separately operable for effecting tilting of the seat and conjointly operable to effect raising and lowering of the seat, all include a worm in driving relation to a worm gear which in turn actuates a movable element of the seat adjusting device. Moreover, since the devices each include a worm driving a worm gear, and the worm gear is effective to drive a screw shaft or a pinion, there is a substantial mechanical advantage in the devices which permits an electric motor of proper rating to be connected directly to a rotatable element of the seat adjusting devices, and specifically, to be directly connected to the worm.

The means for effecting power adjustment of the seat includes a motor 32 of special design. For the seat supporting and adjusting mechanism disclosed in FIGURES 1 and 2, which calls for independent adjustment of three separate devices, the motor 32 comprises separately rotatable closely spaced parallel armatures 34a, 34b and 34c. Armatures 34a, 34b and 34c are respectively directly connected by flexible drive cables indicated generally at 65a, 65b and 65c to the seat adjusting devices including actuating means 25, and worm 29, worm gear 30. Associated with each armature is a pair of generally semi-cylindrical permanent magnets 36a, 37a; 36b, 37b; and 36c, 37c. Magnets of this type are available under the trade name "Indox" which are described as having the chemical composition $BaFe_{12}O_{18}$. Each of the magnets has an angular extent of somewhat less than 180 degrees so as to leave the magnets in the spaced relationship illustrated. It may be noted at this time however, that the spacing indicated at 38 between adjacent magnets at the same side of the motor is not essential and the magnets may if desired contact throughout this zone.

In accordance with this embodiment of the present invention, all of the cylindrically shaped ceramic magnets 36a, 36b and 36c at the same side of the motor 32 may have identical polarity and this relationship is indicated in the drawing where the letters N and S are applied to the magnets to indicate the polarity thereof. It is to be understood that the illustrated polarity is such that each of the generally semi or partly cylindrical magnets has its inner concave surface acting as a single continuous pole face which is opposite in polarity from the outer convex surface. With the relationship illustrated in FIGURE 3 it will be observed that each of the armatures 34a, 34b and 34c is associated with a pair of partly cylindrical magnets, the polarity of each of the magnets of a pair associated with a single armature being reversed. That is to say, the magnets illustrated in association with the left hand armature 34a, are at the upper side of the motor as seen in the figure, a magnet having its inner concave surface a south pole whereas the opposed magnet at the underside of the motor has its inner concave surface a north pole. It will be observed that in the illustrated embodiment of FIGURE 3 all of the magnets at the upper side of the motor as seen in this figure have inner concave south poles, whereas all of the magnets at the lower side of the motor as illustrated in this figure have inner concave north poles.

Surrounding the assembly of magnets and armatures is a single continuous iron shell or casing 40 which not only supports the ceramic magnets in the illustrated relationship, but which constitutes a support for the entire motor structure and most importantly, provides a flux path suitably interconnecting the ceramic magnets. It may be mentioned at this time that the ceramic magnets, unlike previously known magnets, have a permeability not much greater than the permeability of air.

While a preferred form of motor including a specific arrangement of permanent ceramic magnets has been described in the foregoing, it is to be understood that variations in the detailed construction of the motor are contemplated. In practice, the magnetic means may comprise two magnets suitably magnetized and arranged to provide for the required flux distribution, or it may comprise a plurality of pairs of independent magnets, each pair of magnets being associated with an armature.

Referring now to FIGURE 4 there is illustrated one of the foregoing arrangements in which a pair of suitably magnetized permanent ceramic magnets is employed. In this figure three closely spaced rotatable armatures 70a, 70b and 70c with their axes occupying a common plane are provided. The magnetic fields for these three armatures are provided by two elongated permanent magnets 72 and 74. The magnets 72 and 74 respectively extend along one side of the array of armatures 70a, 70b and 70c and are each provided with a plurality (in the illustrated embodiment, three) cylindrically formed recesses 76a, 76b and 76c for the magnet 72, and 78a, 78b and 78c for the magnet 74.

The magnet 72 is polarized so that its inner surface, confronting the armatures 70a, 70b and 70c, is a north magnetic pole throughout, whereas the magnet 74 has its inner surface confronting the armatures 70a, 70b and 70c and is a south magnetic pole throughout. This of course requires that the outer surface of the magnet 72 is a south pole whereas the outer surface of the magnet 74 is a north pole. The polarity of the magnets is illustrated in FIGURE 4.

Both the magnets 72 and 74 have their outer surfaces in the form of a flat planar surface, curved at the ends, and adapted to engage the inner surface of an iron shell or casing 80 which extends continuously around the motor and provides a path for magnetic flux interconnecting the outer south pole of the magnet 72 and the outer north pole of the magnet 74.

This arrangement offers the advantage that the iron shell or casing is of the simplest possible configuration comprising flat side portions interconnected by generally semi-cylindrical end portions.

Referring now to FIGURE 5 there is illustrated a somewhat different embodiment of the present invention. As seen in this figure, the motor comprises an iron shell or housing 90 serving to provide a return path for magnetic flux and including the three rotatable armatures 92a, 92b and 92c. Associated with the armature 92a are the generally arcuate shaped magnets 94 and 96 disposed so that the magnet 94 has a south pole at its concave inner surface, whereas the opposing magent 96 has its inner concave surface constituting a north magnetic pole. The arrangement of the magnets 98 and 100 associated with the armature 92c seen at the right of the figure, is identical with the arrangement of the magnets associated with the armature 92a. However, the magnets 102 and 104 associated with the central armature 92b, have their polarity reversed with respect to the magnets at the ends of the motor housing. Thus, the magnet 102 at the top of the figure has its north pole located at its inner concave surface whereas the opposing magnet 104 has its south pole located at the inner concave surface.

The drawings and the foregoing specification constitute a description of the improved seat adjustment mechanism in such full, clear, concise and exact terms as to enable any person skilled in the art to practice the invention, the scope of which is indicated by the appended claims.

What I claim as my invention is:

1. Seat supporting and adjusting mechanism for a vehicle comprising seat support members, a plurality of independently operable seat adjusting devices connected to said members, separate actuating means connected to each of said devices, each of said actuating means comprising a force multiplier including a rotary input member, and motor means connected to each of said rotary input members, said motor means comprising a separate selectively reversible rotary armature for each of said input members, said armatures being disposed in parallelism with their axes in a common substantially horizontal plane, permanent magnet means providing opposite magnetic poles at opposite sides of each armature, and a single iron flux return and casing member surrounding said magnet means and interconnecting the opposite poles at opposite sides of each armature, and permanently connected drive means connecting each of said armatures to a different one of said rotary input members.

2. Mechanism as defined in claim 1 in which said adjusting devices are a pair of devices for selectively moving the front and rear of said seat support members vertically and a third device for moving said seat support members longitudinally of the vehicle.

3. Mechanism as defined in claim 1 in which said magnet means comprises a pair of separate permanent magnets at opposite sides of each of said armatures, each magnet having a recess to receive a portion of an armature and to provide a pole face for flux distribution thereto, and in which said flux return and casing member engages the pole faces of said magnets opposite to the pole faces thereof adjacent said armatures.

4. Mechanism as defined in claim 1 in which said force multipliers comprise worms and worm gears, the rotary input members are the worms, and the drive means comprises flexible drive cables connecting each of said armatures with one of the rotary input means.

5. Mechanism as defined in claim 1 in which said magnet means comprises a first permanent magnet extending along one side of all of said armatures, and a second permanent magnet extending along the opposite side of all of said armatures, each of said magnets having recesses of circularly curved cross-section in which said armatures are partly received.

6. Mechanism as defined in claim 5 in which the side of said magnets remote from said armatures are flat for their major extent, and in direct contact with the inner surface of said casing member.

References Cited

UNITED STATES PATENTS

| | | | |
|---|---|---|---|
| 1,131,921 | 3/1915 | Fischer | 310—154 |
| 1,575,538 | 3/1926 | Bushnell | 310—114 XR |
| 2,059,886 | 11/1936 | Merrill | 310—154 |
| 2,717,969 | 9/1955 | Buchhald et al. | 310—112 |
| 2,929,439 | 3/1960 | Tanaka et al. | 248—393 |
| 2,939,024 | 5/1960 | Mabuchi | 310—154 |
| 3,081,973 | 3/1963 | Arlauskas et al. | 248—393 |
| 3,089,676 | 5/1963 | Pickles | 248—394 |
| 3,124,332 | 3/1964 | Hexl | 248—420 |
| 3,215,875 | 11/1965 | Latta | 310—154 |

FRANCIS K. ZUGEL, *Primary Examiner.*

U.S. Cl. X.R.

248—420; 297—330